Dec. 29, 1964 G. W. SODERMAN 3,162,936
FIXTURE FOR ASSEMBLING ELECTRICAL COMPONENTS
Filed March 25, 1963 3 Sheets-Sheet 1
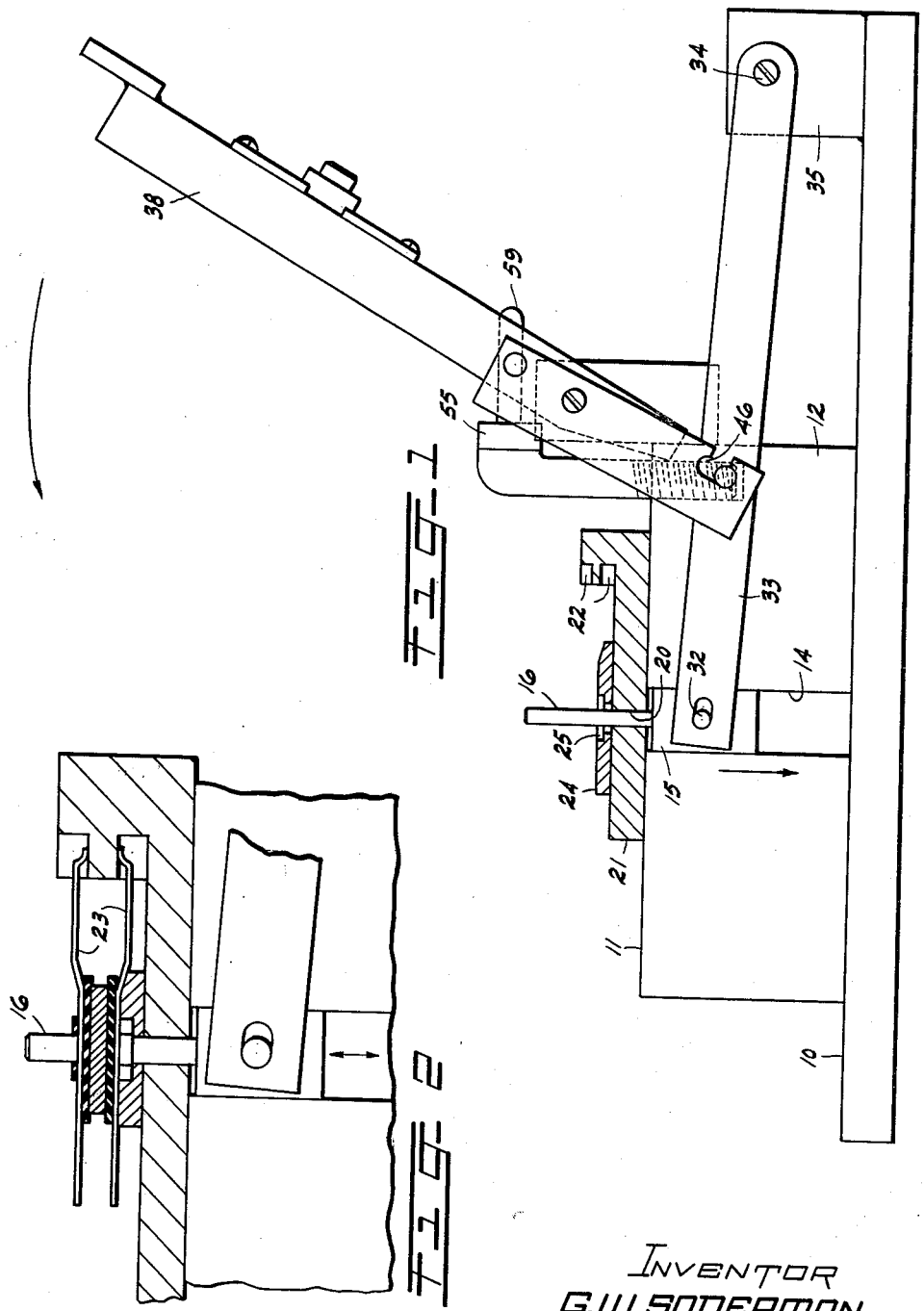
INVENTOR
G.W. SODERMAN
By W.T. Johnson
ATTORNEY

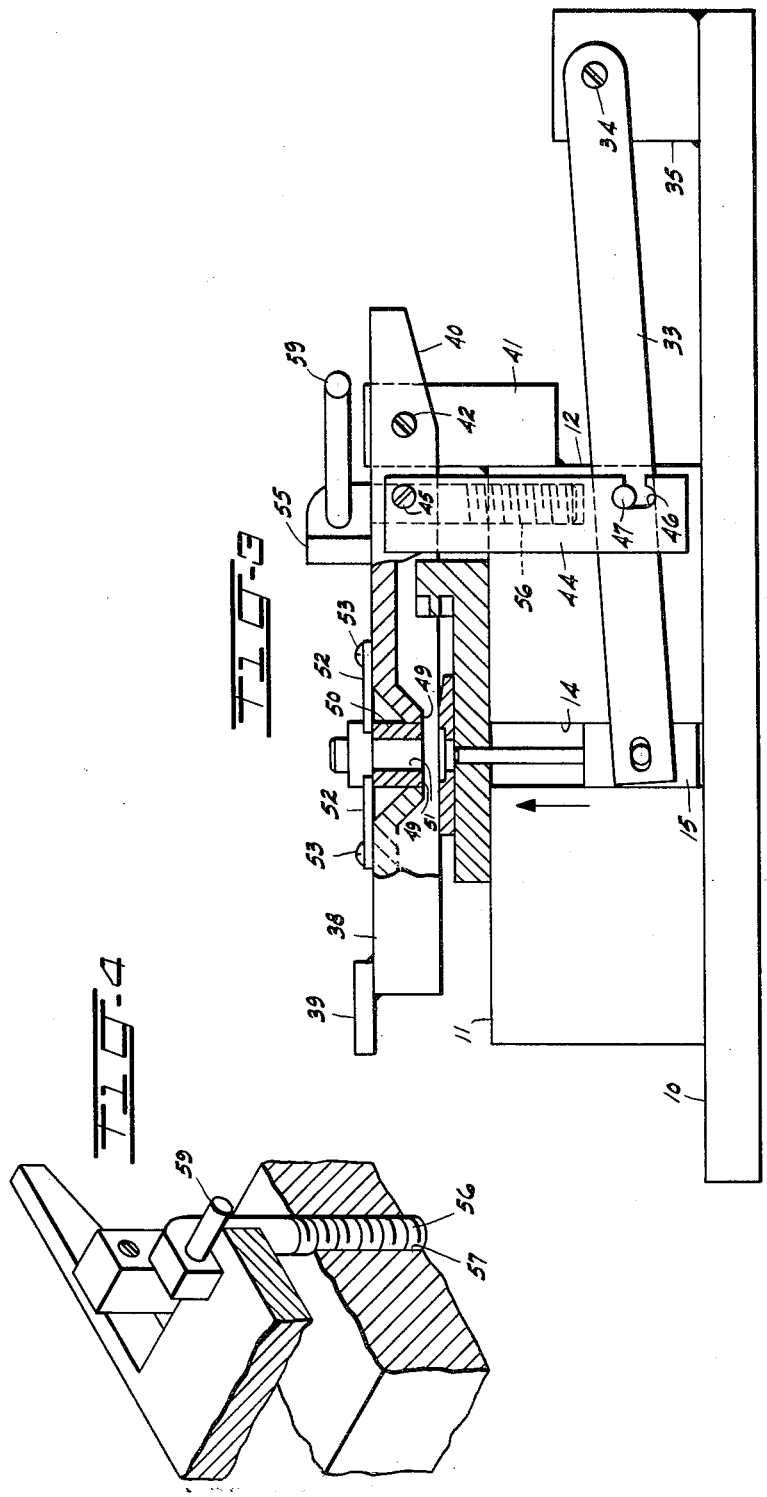

United States Patent Office 3,162,936
Patented Dec. 29, 1964

3,162,936
FIXTURE FOR ASSEMBLING ELECTRICAL COMPONENTS
George W. Soderman, Alpine, N.J., assignor to Western Electric Company Incorporated, New York, N.Y., a corporation of New York
Filed Mar. 25, 1963, Ser. No. 267,461
5 Claims. (Cl. 29—203)

This invention relates to a fixture for assembling electrical components, particularly for assembling spring units in apertured mounting bars.

In the manufacture of telephone equipment, numerous components are assembled on mounting bars and these bars are to be mounted in the equipment such as switchboards and the like. In the present instance, the components are spring units used as lamp sockets for switchboards and each mounting bar has numerous spring units to be mounted thereon. The spring units must be spaced accurately from each other and provided with the conventional insulating sleeves, washers and strips to electrically separate them from each other.

An object of the present invention is a fixture which greatly facilitates and assures accurate assembly of spring components in apertured mounting bars.

According to the object the fixture includes an apertured holder for a nut, an apertured nest for the components and the mounting bar, a locating pin adapted to be moved through the apertures of the holder and nest to assist in locating the components of a spring unit relative to each other in the nest and the apertures aligned with the nut in the holder while means is operable to clamp the components against displacement.

Other objects and advantages will be apparent from the following detailed description when considered in conjunction with the following detailed drawings wherein:

FIG. 1 is a side elevational view of the fixture shown in open position;

FIG. 2 is an enlarged fragmentary view of the fixture showing the parts assembled therein;

FIG. 3 is a side elevational view of the fixture shown in closed position, portions thereof being shown in section;

FIG. 4 is a fragmentary isometric view showing the locking means for the fixture;

Figure 6:
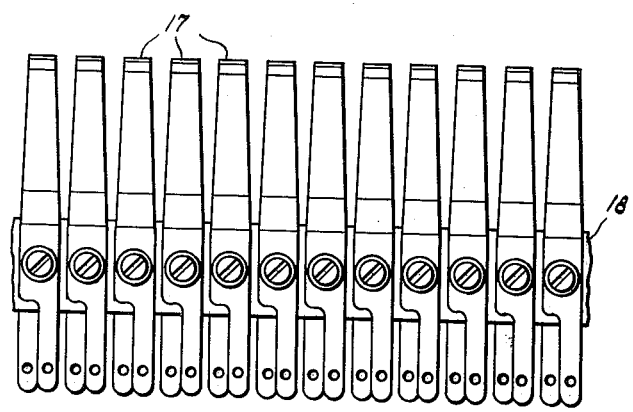
FIG. 6 is a fragmentary top plan view of a mounting bar with a plurality of spring units mounted thereon.

The fixture includes a base 10 which may be mounted on a suitable support, such as a bench. Vertical members 11 and 12 are mounted on the base and spaced from each other as at 14 to provide vertical guiding surfaces for a pin holder 15. The holder 15 has equally spaced locating pins 16 mounted thereon, the pins being equal to the number of spring units, indicated generally at 17, FIG. 6, to be assembled on a mounting bar 18. In the present instance, there are twenty locating pins 16 extending upwardly from the holder 15 and guided vertically in apertures 20 of nests 21. The nests 21 are disposed in one member mounted on the upper surfaces of the members 11 and 12 and have pairs of pockets 22 for apertured components such as springs 23. The apertures in the springs are adapted to receive their respective pins 16. A holder 24, mounted on the member for the nests 21, has a hexagonal recess 25 about each aperture therein which is aligned with the aperture 20 of the nest at each instance to receive a nut 26 at each position which will be a part of the assembly of each spring unit.

Figure 5:
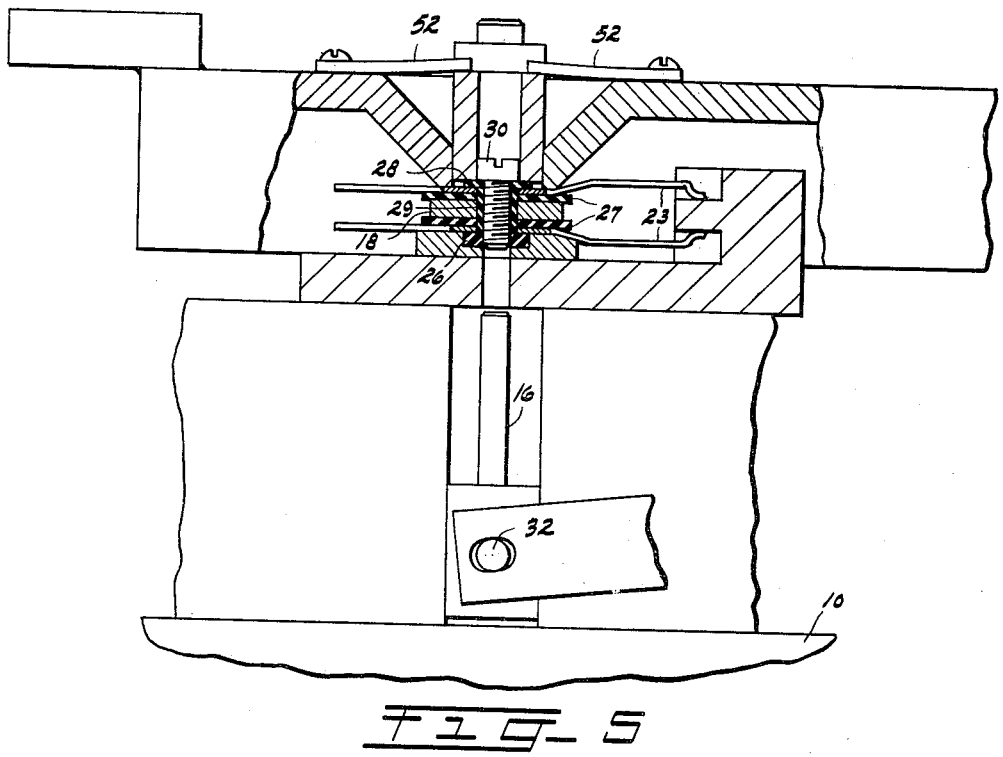
FIG. 5 is a fragmentary sectional view showing the fixture in closed position illustrating the finishing of the assembly.

The other parts of the spring units shown particularly in FIG. 5 in each instance, includes apertured dielectric strips 27, dielectric washers 28 and dielectric sleeves 29 surrounding the screw 30, which is to be driven into the nut 26 to secure the parts of the spring unit to the mounting bar 18.

The ends of the locating pin holder 15 are operatively connected at 32 to like ends of levers 33 which have their other ends pivotally connected at 34 to a vertical member 35 of the base 10. A cover 38 having a handle portion 39 fixed to the forward edge is provided with rearwardly extending members 40 straddling a vertical projection 41 of the member 12 and pivotally mounted thereon at 42. Arms 44, pivotally connected at 45 adjacent their upper ends to the projections 40 of the cover 38 have elongated notches 46 near their lower ends for connection through pins 47 to the levers 33 to serve as operative means for moving the levers 33 and thus the pin holder 15 into the up or assembling position shown in FIG. 1 when the cover is moved into its open position shown in that figure and to also move the pin holder into its down or starting position shown in FIG. 3 when the cover is closed. The cover includes spaced members 49 positioned to engage the top springs of the assemblies and to force the groups of components for each spring unit into compact relation with each other and the mounting bar. A guide 50 having a series of apertures 51 therein spaced according to the spacing of the locating pins 16 is supported by inner edges of a pair of resilient members 52, their outer ends secured to the cover at 53 to serve two purposes: (1) to apply pressure to the washers 28 and the sleeves 29 to assure their relative position in the assemblies and (2) to serve as guides for the screws 30 as they are dropped in the apertures 51 and driven into the nuts 26 by the conventional screw driving means.

In the present instance, the pressure is applied to the cover manually and although the pressure applied initially in this manner may vary from that desired during the finishing of the assemblies by the driving of the screws into this position, the actual force retained during this period is determined by a latch 55. This latch has a threaded shank 56 rotatable in a threaded aperture 57 in the member 12 through the aid of a handle 59. When turned counter-clockwise into the position shown in FIG. 1, the latch is first loosened and then moved free of the cover 38. The cover is then free to be moved into the open position. After the cover is closed and pressure is applied thereto, the latch 55 may be rotated clockwise to the position shown in FIGS. 3 and 4 where a predetermined pressure or holding force is applied to the components of the spring units while the assemblies are finished through the driving of the screws 30 into place. Actually, the holding force is increased through the threads of the latch as the latch is turned clockwise.

*Operation*

With this fixture the numerous spring units may be assembled on their respective pin 16 when the cover 38 is in its open position shown in FIG. 1. The action of the cover when moved into open position causes movement of the pins 16 into their assembling positions where the nuts 26 may be located readily in the recesses 25 of the holder 24, after which the other components may be readily assembled including the location of the lower springs 23, the lower dielectric strip 27, the mounting bar 18, the sleeves 29, the upper dielectric strip 27, the upper springs 23 and the upper washers 28 may be located in their respective nests. At this time, the cover may be closed to hold all of the components of each spring unit in their respective position locking them under a predetermined variable pressure by the threaded latch 55 and removing the pins 16 through the operating means embodied in the arms 44 to condition the assemblies to receive the screws 30. The screws 30 will be guided into position through the apertures 51 thus completing the assemblies. At this time, the cover may be unlatched by moving the latch 55 from the position shown in FIG. 3 to that shown in FIG. 1 and when the cover is opened the pins 16 in returning to their assembly position will serve to eject the completed mounting bar with all of the spring units thereon and condition the fixture for the next group of spring units to be assembled. The elongated notches 46 connecting the arms 44 with the levers 33 through the pins 47 overcome the binding effect of the spring units in the nests during mounting of the screw 30 by allowing the locating pins to apply hammer-like blows to the assembly to eject it from the fixture.

It is to be understood that the above-described arrangements are simply illustrative of the application of the principles of the invention. Numerous other arrangements may be readily devised by those skilled in the art and which will embody the principles of the invention and fall within the spirit and scope thereof.

What is claimed is:

1. A fixture for assembling apertured components of spring units to an apertured mounting bar by means of screws and nuts comprising:

a holder having apertures for nuts spaced according to spacing of the apertures in the mounting bar, an apertured nest for the mounting bar and groups of the components of the spring units, locating pins for the apertures of the nest, a holder for locating pins supported for movement between starting and assembling positions to respectively position the locating pins out of and into their assembling positions, a cover supported for movement between an open position away from the nest and a closed position adjacent to the nest, members carried by the cover to traverse the groups of components to force the components of the groups compactly against the mounting bar, and a member carried by the cover having screw guiding apertures therein aligned with the apertures of the groups of components and the nuts.

2. A fixture for assembling apertured components of spring units to an apertured mounting bar by means of a screw and nut comprising:

a base having spaced vertical members, an apertured nest for the components and the mounting bar mounted on the vertical members with the aperture aligned with the space between the members, an apertured holder for the nut mounted on the nest with the aperture aligned, a locating pin disposed in the space between the members and adapted to be moved through the apertures of the holder and nest to assist in locating the components of a spring unit relative to each other in the nest with their apertures aligned with the nut in the holder, a cover supported by the base for movement between an open position away from the nest and a closed position adjacent to the nest, members carried by the cover to force components of the spring unit into close engagement, and an apertured guide for a screw movable with the cover and aligned with the nut and the apertures of the components when the cover is closed.

3. A fixture for assembling apertured components of spring units to an apertured mounting bar by means of a screw and nut comprising:

a base having spaced vertical members, an apertured nest for the components and the mounting bar mounted on the vertical members with the aperture aligned with the space between the members, an apertured holder for the nut mounted on the nest with the apertures aligned, a locating pin disposed in the space between the members and adapted to be moved through the apertures of the holder and nest to assist in locating the components of a spring unit relative to each other in the nest with their apertures aligned with the nut in the holder, a cover supported by the base for movement between an open position away from the nest and a closed position adjacent to the nest, members carried by the cover to force components of the spring unit into close engagement, an apertured guide for a screw movable with the cover and aligned with the nut and the apertures of the components when the cover is closed, and resilient means supporting the apertured guide in the cover and adapting the guide to apply a predetermined holding force to certain of the components and guide a screw through the apertures of components and into the nut.

4. A fixture for assembling apertured components of spring units to an apertured mounting bar by means of a screw and nut comprising:

a base having spaced vertical members, an apertured nest for the components and the mounting bar mounted on the vertical members with the aperture aligned with the space between the members, an apertured holder for the nut mounted on the nest with the apertures aligned, a locating pin disposed in the space between the members and adapted to be moved through the apertures of the holder and nest to assist in locating the components of a spring unit relative to each other in the nest with their apertures aligned with the nut in the holder, a cover supported by the base for movement between an open position away from the nest and a closed position adjacent to the nest, members carried by the cover to force components of the spring unit into close engagement, a holder for the locating pin supported for movement between starting and assembling positions to respectively position the locating pin out of and into its assembling position, and means operated by the cover when moved into its closed and open positions respectively to move the holder for the locating pin out of and into its assembling position.

5. A fixture for assembling apertured components of spring units to an apertured mounting bar by means of a screw and nut comprising:

a base having spaced vertical members, an apertured nest for the components and the mounting bar mounted on the vertical members with the aperture aligned with the space between the members, an apertured holder for the nut mounted on the nest with the apertures aligned, a locating pin disposed in the space between the members and adapted to be moved through the apertures of the holder and nest to assist in locating the components of a spring unit relative to each other in the nest with their apertures aligned with the nut in the holder, a cover supported by the base for movement between an open position away from the nest and a closed position adjacent to the nest, members carried by the cover to force components of the spring unit into close engagement, a holder for the locating pin supported for movement between starting and assembling positions to respectively position the locating pin out of and into its assembling position, and means operatively connecting the cover to the holder for the locating pin so that when the cover is closed the holder for the locating pin will be moved out of its assembling position, and so that when the cover is opened the holder for the locating pin will cause the locating pin to eject the assembly from the nest and be positioned for the nest assembly of components.

References Cited in the file of this patent

UNITED STATES PATENTS

| | | |
|---|---|---|
| 2,706,331 | Bartelheim et al. | Apr. 19, 1955 |
| 2,728,092 | Poupitch | Dec. 27, 1955 |
| 2,752,618 | Stern | July 3, 1956 |
| 2,865,089 | Machian | Dec. 23, 1958 |
| 3,037,269 | Barkstrom et al. | June 5, 1962 |